(12) United States Patent
Noh et al.

(10) Patent No.: US 6,680,149 B2
(45) Date of Patent: Jan. 20, 2004

(54) SOLID POLYMER ELECTROLYTES USING POLYETHER POLY (N-SUBSTITUTED URETHANE)

(75) Inventors: Si-Tae Noh, Seoul (KR); Jung-Ohk Kweon, Mujoo (KR); Hee Sung Choi, Goyang-shi (KR)

(73) Assignee: Hanyang Hak Won Co., Ltd., Seoul (KR)

( * ) Notice: Subject to any disclaimer, the term of this patent is extended or adjusted under 35 U.S.C. 154(b) by 256 days.

(21) Appl. No.: 09/968,734

(22) Filed: Oct. 1, 2001

(65) Prior Publication Data

US 2002/0042002 A1 Apr. 11, 2002

(30) Foreign Application Priority Data

Oct. 2, 2000 (KR) ........................................ 2000-57810
Oct. 25, 2000 (KR) ........................................ 2000-62811

(51) Int. Cl.[7] ............................................. H01M 10/40
(52) U.S. Cl. ................... 429/314; 429/317; 429/322; 429/323; 429/337; 429/338; 429/342; 429/329; 429/330; 429/331; 429/332; 429/333
(58) Field of Search ................................ 429/314, 317, 429/322, 323, 337, 338, 342, 332, 333, 329, 330, 331

(56) References Cited

U.S. PATENT DOCUMENTS

| 3,639,341 A | 2/1972 | Krimm et al. |
| 3,640,955 A | 2/1972 | Krimm et al. |
| 5,337,184 A | 8/1994 | Helms et al. |
| 5,837,157 A | 11/1998 | Kohjiya et al. |

FOREIGN PATENT DOCUMENTS

| DE | 1 720 693 | 7/1971 |
| DE | 1720 706 | 7/1971 |
| DE | 1 720 761 | 7/1971 |
| EP | 0 434 011 A1 | 6/1991 |
| GB | 1 219 671 | 1/1971 |
| JP | 63154736 | 6/1988 |
| JP | 63241026 | 10/1988 |

OTHER PUBLICATIONS

Beachell et al., Dilute Solution Studies of Nitrogen–Substituted Polyurethanes, Journal of Polymer Science, 1969, 7:1873–1879.

*Primary Examiner*—Laura Weiner
(74) *Attorney, Agent, or Firm*—Pennie & Edmonds LLP

(57) ABSTRACT

The present invention relates to a solid polymer electrolyte of polyether poly(N-substituted urethane) comprising an electrolytic compound and a polymer matrix, wherein the polymer matrix is a copolymer comprising polyether unit and polyurethane unit and has 50,000–2,000,000 of a weight average molecular weight, where N-positions of the polyurethane unit are substituted with oligo(ethylene oxide) derivatives which provide flexibility and electrolytic conduction of the polymer matrix by controlling its length, composition, structure and crosslinked degree. Accordingly, the solid polymer electrolyte of the present invention provides excellent thermal stability, electrochemical stability and mechanical properties and thus, is suitable for use in polymer secondary batteries and electrochemical devices.

14 Claims, 3 Drawing Sheets

SOLID POLYMER ELECTROLYTES USING POLYETHER POLY (N-SUBSTITUTED URETHANE)

FIELD OF THE INVENTION

The present invention relates to a polyether poly(N-substituted urethane) and a solid polymer electrolyte. More particularly it relates to a solid polymer electrolyte which is suitable for electrochemical devices (e.g., battery, capacitor and sensor), antistatic agents, and electricity-controlling materials for rubber and plastics.

BACKGROUND OF THE INVENTION

Conventional electrolytes, which are used for electrochemical devices such as chargers, capacitors and sensors, have been prepared as solutions or pastes for better electric conductivity. However, these devices are likely to be damaged due to leakage of liquid and it is difficult to reduce the size and volume of electrolytes because a separator is required with liquid electrolytes. In order to solve the above-mentioned problems, the solid electrolytes prepared by using inorganic crystalline substances, inorganic glasses and organic polymers have been developed. The organic polymers are normally superior in processing characteristics and molding characteristics and the resulting solid electrolytes have flexibility and bending processing characteristics. Design freedom of the device for which the solid polymer electrolyte is applied becomes large. However, the organic polymer substance is inferior to other materials in ion conductivity at present.

In order to solve such problems, numerous efforts have been made to develop various solid polymer electrolytes, pure solid polymer electrolytes, gel-type polymer electrolytes, hybrid polymer electrolytes and the like.

Polymer matrixes of gel-type solid polymer electrolyte and hybrid polymer electrolyte are impregnated with excessive amount of electrolytic solution to obtain good ionic conductivity. However, some electrolytic solution impregnated into the polymer matrix can be leaked and reduce the characteristics as batteries.

On the other hand, since an ionic conductivity of pure solid polymer electrolyte can be obtained by local segmental motion, pure solid polymer electrolyte prepared by using a polyether and a plasticizer salt has no leakage of electrolytic solution but has a reduced ionic conductivity. Grafted solid polymer electrolytes having polyoxyethylene side chains with low molecular weight for rapid chain migration have also been introduced to solve such problems.

For example, a method for manufacturing a solid polymer electrolyte comprising an alkali metal salt and a polymeric adduct prepared by reacting hydroxy-functional acrylic copolymer and polyether monoisocyanate is disclosed in U.S. Pat. No. 5,337,184. The resulting solid polymer electrolyte has improved flexibility but the acrylic copolymer has no contribution to improve ionic conductivity.

Recently, a polyether copolymer having oligooxyethylene side chains as a solid polymer electrolyte has been disclosed in Japanese Laid-Open Publication Nos. 63-154736 and 63-241026, European Patent No. 434011 and U.S. Pat. No. 5,837,157. Although these solid polymer electrolytes show good ionic conductivity at low temperature, they show poor mechanical characteristics and the processes for preparing them are complicated.

There have been also two conventional methods for preparing poly(N-substituted urethane).

The first method of solution or melt polymerization is disclosed in German Patent Nos. 1,720,693, 1,720,706, and 1,720761. For example, N-methyl polyurethane having high molecular weight is prepared by polycondensation of $\alpha,\alpha'$-(4,4-di-N-methylaminodiphenyl)-p-diisopropyl benzene and bisphenol A bis(chlorocarbonic ester) in two-phase reaction medium comprising aqueous sodium hydride solution and methylene chloride/chlorobenzene mixture.

The other method for preparing poly(N-substituted urethane) has been developed by the formation of polyurethane sodium salt through removing active hydrogen by using sodium hydride or sodium and then nucleaphilic substitution reaction with an alkyl halide. For example, polyurethane comprising ethylene glycol and methylenebis (phenyl isocyanate) (MDI) dissolved in dimethylformamide (DMF) is dropped into sodium hydride dissolved in DMF to give polyurethane sodium salt. After one hour, the sodium salt is reacted with methyl iodide dissolved in DMF under inert gas atmosphere at 0° C. for two hours to produce the corresponding N-methyl polyurethane (See H. C. Beachell and J. C. Peterson Buck, *J. Polym. Sci., Polym. Chem., Ed.* 7, "dilute solution studies of nitrogen-substituted polyurethanes", 1873–1879, 1969).

However, it has been reported that it is impossible to obtain carbamates corresponding to primary amines with the above-mentioned first method. Although the second method may complement the problem associated with the first method, the sodium hydride having strong basicity used in the second method invites the dissociation of urethanes as a side-reaction and thus, results in a reduced molecular weight of the final product, reduced physical properties and low yield of poly(N-substituted urethane). For example, a conversion rate to poly(N-methyl urethane) in the reaction of ethylene glycol and MDI is about 50% and when a substituent having higher molecular weight than methyl group is replaced for methyl, it is even less than 15% (See H. C. Beachell and J. C. Peterson Buck, *J. Polym. Sci., Polym. Chem., Ed.* 7, "dilute solution studies of nitrogen-substituted polyurethanes", 1873–1879, 1969). The poly(N-sub stituted urethane) has lower mechanical properties than polyurethane and thus it requires an introduction of crosslinking structure.

Further, polyethyleneoxide-grafted polyurethane copolymer may be used for N-substitution reaction in the first method. However, the applications to solid polymer electrolytes obtained by using a polyether copolymer matrix having oligooxyethylene side chains are restricted due to the above-mentioned side reaction and low conversion rate.

Therefore, there are increasing demands for preparing a polyether poly(N-substituted urethane) copolymer which provides an appropriate ionic conductivity and mechanical characteristics and is useful polymer matrix of solid polymer electrolytes by easily controlling the length of side chains, concentrations, compositions, structures and crosslinked degrees.

SUMMARY OF THE INVENTION

Accordingly, an object of the present invention is to provide a solid polymer electrolyte having excellent ionic conductivity, processing characteristics, molding characteristics and mechanical characteristics compared to the conventional solid electrolytes.

In accordance with one aspect of the present invention, there is provided a method for preparing polyether poly(N-substituted urethane) having oligooxyethylene side chains suitable for the solid polymer electrolytic matrix. Another object of the present invention is to provide a battery and permeable membrane for an ion electrode prepared by using the solid polymer electrolyte of the present invention.

BRIEF DESCRIPTION OF THE DRAWINGS

The above and other objects and features of the present invention will become apparent from the following description of the invention, when taken in conjunction with the accompanying drawings, in which.

DETAILED DESCRIPTION OF THE INVENTION

Figure 1A:
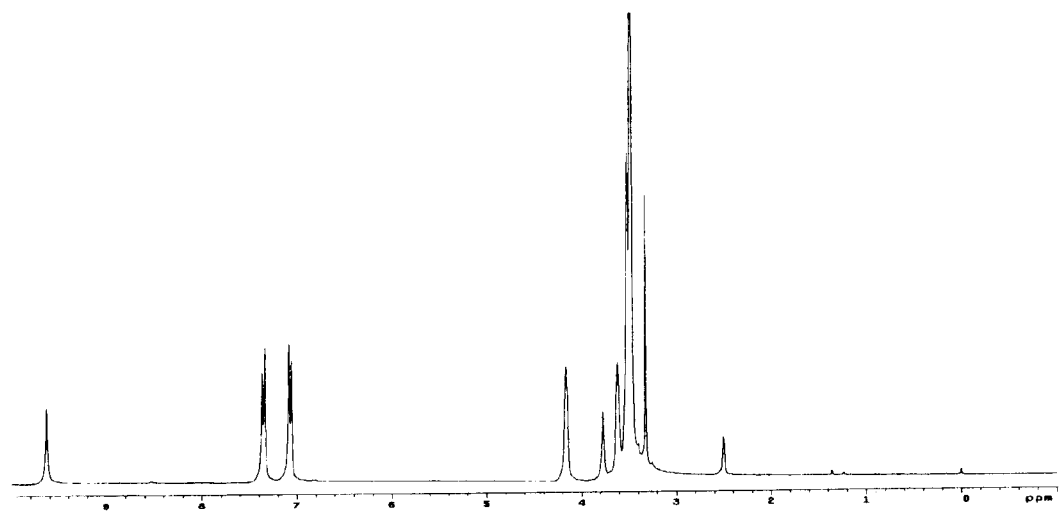
FIG. 1a presents $^1$H-NMR spectrum of the polyether polyurethane prepared in preparation Example.

The present invention provides a solid polymer electrolyte of a polyether poly(N-substituted urethane) comprising an electrolyte compound and a polymer matrix, wherein the polymer matrix has 50,000–2,000,000 of an weight average molecular weight and comprises a polyether unit of the following formula (1) and a main chain structure of N-substituted urethane unit having oligooxyethylene side chains of the following formula (2):

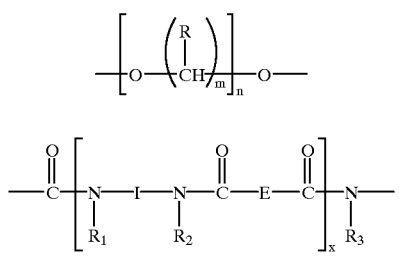

wherein R is a hydrogen atom or alkyl; R1, R2, and R3 are optionally alkyl, aryl, alkylaryl or oligo(ethylene oxide) derivative and at least one is an oligo(ethylene oxide) derivative; I is isocyanate; E is glycol or amine having a number average molecular weight of 400 or less; m is an integer of 2–4; n is an integer of 1–60; and x is an integer of 1–5.

The present invention is described in more detail as set forth hereunder. The solid polymer electrolyte of the present invention comprises an electrolyte compound such as inorganic salt and polyether poly(N-substituted urethane) matrix having oligooxyethylene side chains. The solid polymer electrolyte of the present invention can contain organic solvent as needed.

Polyether polyol forming the polyether unit of formula (1) is preferably a diol or a triol having a molecular weight of 100–1500 such as a diol or triol selected from poly(oxytetramethylene) glycol, poly(oxyethylene) glycol, and poly(oxypropylene) glycol; a copolymerized polyol having a molecular weight of 100–1500 that is between ethylene oxide and propylene oxide; or a low- molecular weight polyol.

In the urethane unit of formula (2), the isocyanate unit I can be an aromatic or aliphatic polyisocyanate. Examples of the isocyanate include but are not limited to 2,4-tolylene diisocyanate, 2,6-tolylene diisocyanate, 4,4-biphenylene diisocyanate, 1,3-cyclophenylene diisocyanate, 1,4-cyclophenylene diisocyanate, hexamethylene diisocyanate, 1,4-phenylene diisocyanate, 1,4-naphthalene diisocyanate, 1,5-naphthalene diisocyanate, isophorone diisocyanate (IPDI), bis(4-isocyanatocyclohexyl)methane, bis(4-isocyanatophenyl)methane, m-xylene diisocyanate, and N,N',N"-tris(6-isocyanatohexamethylene)biuret.

In the urethane unit of formula (2), E of the urethane unit is a glycol or amine group having a number average molecular weight of less than 400. Examples of E include but are not limited to ethylene glycol, diethylene glycol, 1,4-butandiol, 1,6-hexandiol, neopentyl glycol, ethylenediamine, hexamethylenediamine, diethylenetriamine, triethylenetetramine, tolylenediamine, 4,4'-biphenylenediamine, and isophorone diamine.

In the urethane unit of formula (2), at least one of N-substituents $R_1$, $R_2$, and $R_3$ is an oligo(ethylene oxide) derivative and an example is the following formula (3):

wherein $R_4$ is $C_1$–$C_{12}$ alkyl, mesyl, tosyl, acryl, methacryl, vinyl or glycerol diethoxylate expressed in the following formula (4a) or (4b) wherein y and r are independently an integer of 1–20:

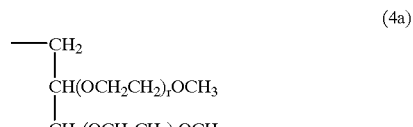

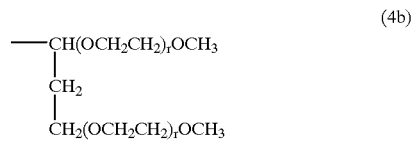

Oligo(ethylene oxide) derivatives of formula (3) essentially used as an alkylating agent may be used alone or in a combination of two or more to control the length, composition, or structure of the side chain of the polyether poly(N-substituted urethane) depending on the purpose.

Polyether poly(N-substituted urethane) having oligooxyethylene side chains of the present invention has a weight average molecular weight of 50,000–2,000,000, preferably 200,000–1,500,000. It provides the following characteristics to be useful for the solid polymer electrolytic matrix.

The ionic conductivity is improved by increasing ionic concentration and ion migration. Polyether poly(N-substituted urethane) comprises the main chain of a polyethylene oxide unit exhibiting excellent ionic conductivity and an urethane unit having improved ionic conductivity. The side chain of low molecular polyethylene oxide performs internal plasticizing action, resulting in increasing the dissociation of electrolytes, the formation of amorphous solid polymer electrolytes, and significant improvement in ionic conductivity with increased ion migration through the chain reaction.

The polyether poly(N-substituted urethane) also has excellent physical characteristics through crosslinking of crosslinkable functional groups. The polyether poly(N-substituted urethane) further provides excellent thermal stability, electrochemical stability, processing characteristics, and low surface resistance between electrode and solid polymer electrolyte due to excellent adhesion to the electrode.

It is possible to control the length, composition and structure of side chains by introducing side chains to the linear polymer. It is further possible to control the crosslinked degree by employing an appropriate amount and functionality of a crosslinking agent.

The polyether poly(N-substituted urethane) of the invention solves the leakage of electrolytic liquid and prevents the corrosion of electrodes by using no or minimum amount of organic solvents. Therefore, it can be used in various electrochemical devices such as a secondary battery with less cost.

The present invention further provides a method for preparing polyether poly(N-substituted urethane) having the oligooxyethylene side chains. Polyether poly(N-substituted urethane) of the present invention is prepared by reacting a polyether polyurethane and organic alkaline metal salt to give the polyether polyurethane metal salt and then alkylating the result metal salt with tosylate or mesylate. The reactions are presented as follows:

prepared as a solution with the use of a solvent. The solvent is preferably a polar organic solvent. Examples of the polar organic solvents include tetrahydrofuran (THF), dimethylformamaide (DMF) and dimethyl sulfoxide (DMSO) or mixtures thereof.

The obtained metal salt of polyether polyurethane is further alkylated with an alkylating agent chosen from tosylate and mesylate to produce the desired polyether poly(N-substituted urethane) having oligo(oxyethylene) side chains.

The reaction between the metal salt of polyether polyurethane and the alkylating agent is performed under inert gas atmosphere at no higher than 15° C., preferably 0–15° C. Tosylate or mesylate of oligo(oxyethylene oxide) derivatives of formula (3) is used as the alkylating agent which is selected from $C_1$–$C_{12}$ alkyl tosylate or alkyl mesylate, benzyl tosylate, 1-naphthyl tosylate, 9-anthryl tosylate, carboxymethyl tosylate and a mixture thereof.

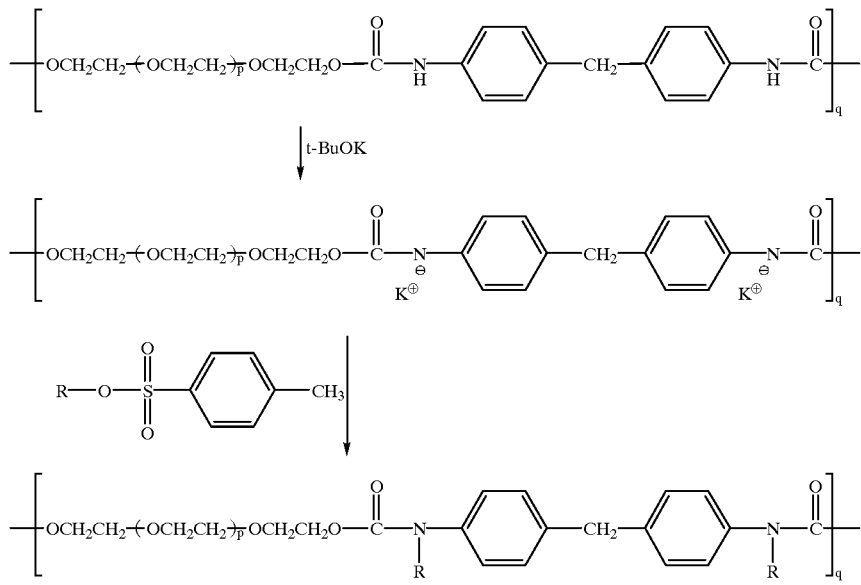

wherein p is an integer of 1–60 and q is an integer of 10–100.

In the above reactions, the polyether polyurethane metal salt is prepared by a general solution polymerization between the polyether polyurethane having a weight average molecular weight of 50,000–2,000,000 and alkaline organic metal salts. The reaction is performed under inert gas atmosphere at no higher than 15° C., preferably 0–15° C. The organic alkaline metal salt is preferably an organic metal salt of alkali metal. Examples of the organic alkali metal salt include but are not limited to potassium tert-butoxide (t-BuOK), lithium amide ($LiNH_2$), sodium amide ($NaNH_2$), and lithium diethylamide ($LiN(CH_2CH_3)_2$). It can be used alone or in a combination of two or more.

The preferred example of the organic alkali metal salt is potassium tert-butoxide (t-BuOK).

In the reaction between the polyether polyurethane and the alkaline organic metal salt, the polyether polyurethane is The oligo(ethylene oxide) derivative as the alkylating agent of formula (3) has a tosyl, acryl, methacryl or vinyl group, which is crosslinkable, at the end portion. Accordingly, it is possible to introduce crosslinked structure by a photo-crosslinking reaction after forming a film, a heat-initiated crosslinking reaction, or by a substitution reaction in a reaction medium. Therefore, the present invention performs an additional crosslinking reaction with crosslinkable functional group introduced at N-substituted group after performing the first and second reactions.

Tosylate or mesylate used as the alkylating agent is prepared by reacting p-toluenesulfonyl chloride or methanesulfonyl chloride with alcohol or its derivative. Tosylate of oligo(ethylene oxide) used as the alkylating agent in the present invention is prepared by the following schemes:

Scheme 1

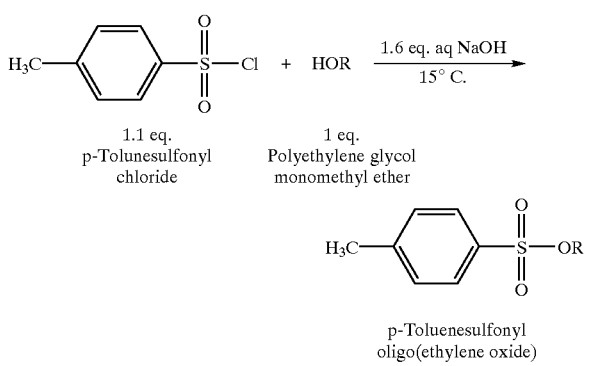

p-Toluenesulfonyl oligo(ethylene oxide)

Scheme 2

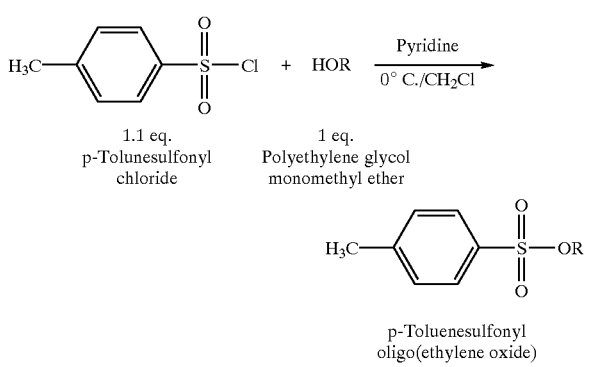

p-Toluenesulfonyl oligo(ethylene oxide)

Scheme 3

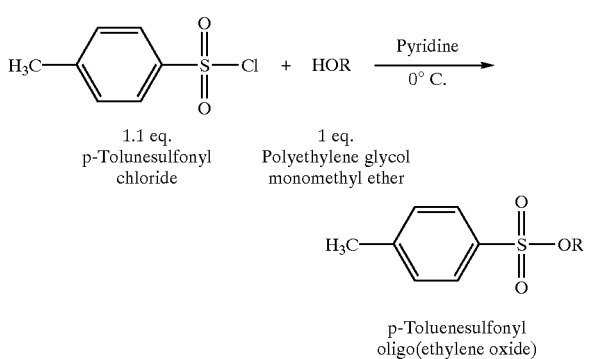

p-Toluenesulfonyl oligo(ethylene oxide)

As described above, the present invention is characterized by using an organic metal salt as a catalyst to reduce a side-reaction during the formation of poly(anions) and using a tosylate or mesylate compound, which has high nucleophilic substitution reaction rate, as an alkylating agent.

The method for preparing polyether poly(N-substituted urethane) of the present invention reduces a side reaction problem which occurs in the conventional method using a strong base such as sodium and sodium hydride. The present invention provides the polymer having excellent mechanical characteristics and excellent substitution on N-position by using an alkaline organic metal salt and a tosylate compound. The tosylate compound has faster nucleophilic substituting rate than alkyl halogen compound which has been used for the conventional alkylating agent and introduces a crosslinked structure at the end portion. The crosslinked structure can be formed by a substitution in a solution or a photo-crosslinking reaction. Further, the present invention provides polyether poly(N-substituted urethane) having oligo(ethylene oxide) side chains obtained by using one or a mixture of alkylating agents to control easily the length, composition and structure.

Electrolyte compound used in the present invention comprises anion and cation and can be dissolved in polyether poly(N-substituted urethane) solution. The electrolyte compound includes at least one cation selected from the group consisting of metal cation, ammonium ion, idium ion and guanidium ion, and at least one anion selected from the group consisting of chloride ion, bromide ion, iodide ion, perchloric ion, thiocyanic ion, tetrafluoroboric ion, nitric ion, $AsF_6^-$, $PF_6^-$, stearylsulfonic ion, octylsulfonic ion, dodecylbenzene sulfonic ion, 7,7,8,8-tetracyano-p-puinodimethane ion, $R'SO_3-$, $(R'SO_2)(R''SO_2)N-$, $(R'SO_2)(R''SO_2)(R'''SO_2)C-$, and $(R'SO_2)(R''SO_2)YC-$, wherein each of R', R", R'" and Y is an electron attracting group, preferably R', R" and R'" are independently perfluoroalyl or perfluoroaryl group having 1 to 6 carbon atoms; and Y is nitro, nitroso, carbonyl, carboxyl, cyano or trialkylammonium.

Transition metal ion can be used as the metal cation and preferred ion is selected from Mn, Fe, Co, Ni, Cu, Zn, Ag and a mixture thereof. Further, satisfied result is obtained by using one selected from Li, Na, K, Rb, Cs, Mg, Ca, Ba and a mixture thereof as the metal cation. It is possible to use two or more kinds of the above metal cations in combination as the electrolyte compound. Examples of the electrolyte compound include lithium perchlorate ($LiClO_4$), lithium tetrafluoroborate ($LiBF_4$), lithium hexafluorophosphate ($LiPF_6$), lithium trifluoromethansulfonate ($LiCF_3SO_3$), lithium bistrifluoromethansulfonylamide (LiTFSI), and a mixture thereof. Among them, $LiPF_6$, $LiClO_4$, $LiCF_3SO_3$, and LiTFSI are widely used for a secondary lithium battery because no substantial glass transition point is shown with addition of such electrolytes.

In the present invention, a ratio of the number of moles of the electrolyte compound used for the total number of moles of ethylene oxide in the main chain and the side chain is preferred to be in the range of 0.0001–5, more preferred to be 0.001–0.5. If the ratio exceeds 5, processing characteristics, molding characteristics, mechanical strength and flexibility become inferior, resulting in a reduced ionic conductivity.

In the present invention, the solid polymer electrolyte can be prepared by mechanically mixing the respective components or dissolving them with the use of a solvent and removing the solvent. As means of mechanically mixing, there can be performed by using kneaders, rolls or extruders, etc. When the dissolution of the components is performed by using the solvent, examples of the solvent include but are not limited to tetrahydrofuran, acetone, acetonitile, dimethylformamide, dimethyl sulfoxide, dioxane, methylethyl ketone and methyl isobutyl ketone, and mixture thereof. These solvents are polar and can be used alone or in a combination thereof. The concentration of the solvent is not specifically limited, but it is preferably used in the range of 1–50 wt. %.

Further, the solid polymer electrolyte of the present invention can contain organic solvent at need. Preferred organic solvent of the solid polymer electrolyte is selected from ethylene carbonate, propylene carbonate, dimethyl carbonate, ethylmethyl carbonate, dipropyl carbonate, diethoxy ethane, dimethoxy ethane, γ-butyactone and a mixture thereof.

Other additives, used by one skilled in the art, such as an inorganic salt and ceramic filler, may be incorporated to the solid polymer electrolyte of the present invention. When an inorganic salt is added with an organic solvent, it is preferred to use 5–15 wt. % to the total weight of the electrolyte. Examples of the ceramic filler are silica, alumina, lithium aluminate, zeolite and a mixture thereof and it is preferred to use 5–25 wt. % to the total weight of the electrolyte.

The solid polymer electrolyte of the present invention is useful to form a thin film having a large-surface area and flexibility. The solid polymer electrolyte is also used for producing batteries by combining positive electrode and negative electrode. Examples of positive electrode materials used for the batteries include lithium-manganese complex oxide, lithium-cobaltate, vanadium pentoxide olyacene, polypyrene, polyaniline, polyphenylene sulfide, polyphenylene oxide, polypyrrol, polyfuran and polyazulene. Examples of negative electrode materials include interlaminated compound wherein lithium is occluded between layers of graphite or carbon, cobalt—lithium or lithium—lead alloy.

Further, the solid polymer electrolyte of the present invention is used for permeable membrane of an ion electrode such as alkali metal ion, Cu ion, Ca ion and Mg ion having high electric conductivity.

Furthermore, the solid polymer electrolyte of the present invention is also effectively useful for solid batteries, condensers having large capacity, and electrochromic display due to its excellent processing characteristics, molding characteristics, mechanical strength and flexibility.

The following examples are intended to further illustrate the present invention without limiting its scope.

Example of Preparation of Polyether Polyurethane

Polyethylene glycol having a number average molecular weight of 400 and bis(4-isocyanatophenyl) methane are mixed to be an equivalent ratio of 1.05: 1 (isocyante : hydroxy group). The mixture was placed in 20 wt. % of tetrahydrofuran and the mixture was reacted under inert gas atmosphere at 50° C. for 5 hours to give polyether polyurethane. The obtained polyether polyurethane has 105,000 of a weight average molecular weight and 278° C. of a pyrolytic temperature in the air measured for 5 wt. % of loss.

Figure 1B:
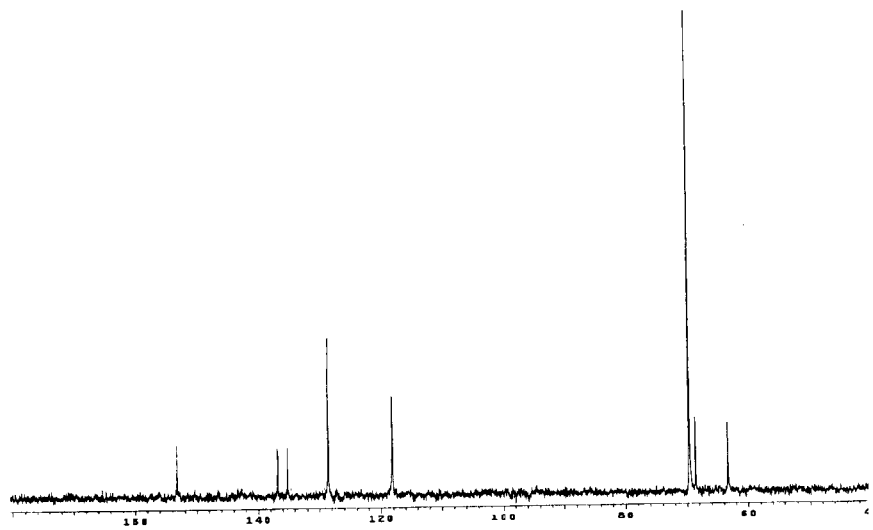
FIG. 1b shows $^{13}$C-NMR spectrum of the polyether polyurethane prepared in preparation Example.

$^1$H-NMR spectrum and $^{13}$C-NMR spectrum of the obtained polyether polyurethane are shown in FIGS. 1a and 1b.

Examples of Preparation of Polyether Poly(N-substituted Urethane)

EXAMPLE 1

10 wt. % tetrahydrofuran of the polyether polyurethane prepared in the above Example was placed into a reactor and an argon gas was passed therein while maintaining a temperature below 10° C. To a reaction mixture was added t-BuOK and reacted for 2 hrs at a temperature of below 10° C. to obtain potassium salt of polyurethane. The result salt was further reacted with methyl tosylate under inert gas atmosphere at a temperature of below 10° C. for 2 hrs and then a small amount of methanol was added to decompose un-reacted t-BuOK. Distilled water was added to precipitate out a polymer and remove by-product tosylate metal salt. The product of polyether poly(N-methyl urethane) was isolated. The pyrolytic temperature and weight average molecular weight were determined and are shown in Table 1.

Figure 2A:
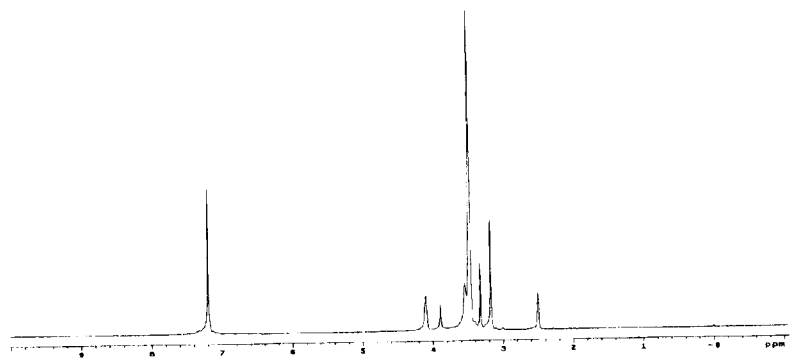
FIG. 2a presents $^1$H-NMR spectrum of the polyether poly(N-methyl urethane) prepared in Example 1.
Figure 2B:
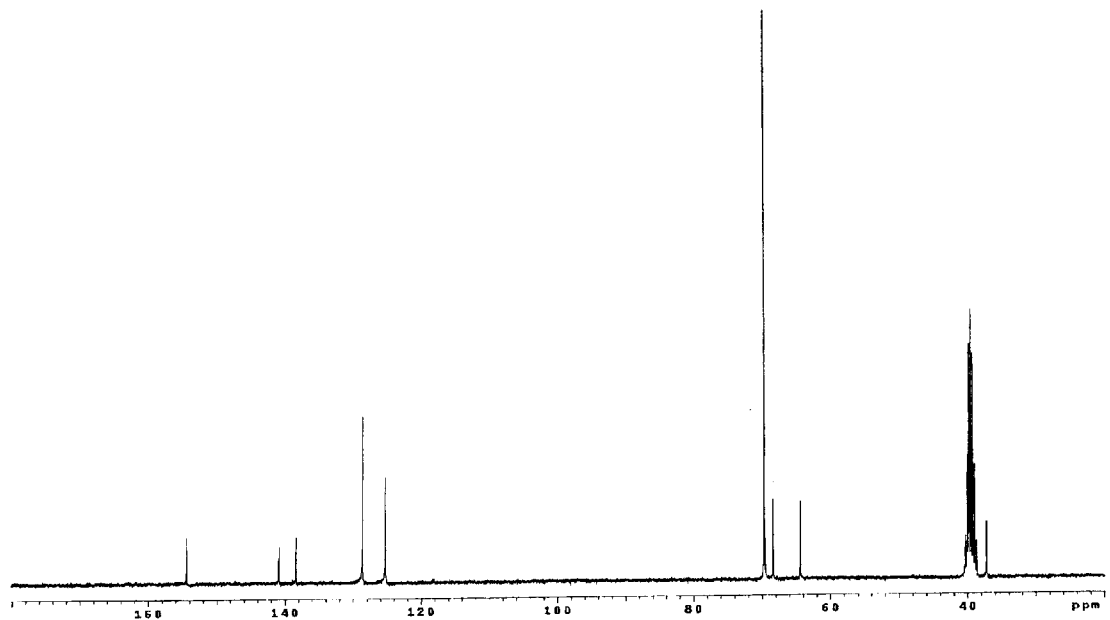
FIG. 2b shows $^{13}$C-NMR spectrum of the polyether poly(N-methyl urethane) prepared in Example 1.

$^1$H-NMR spectrum and $^{13}$C-NMR spectrum of the obtained polyether poly(N-methyl urethane) are shown in FIGS. 2a and 2b.

EXAMPLE 2

10 wt. % tetrahydrofuran of the polyether polyurethane was placed into a reactor and an argon gas was passed therein while maintaining a temperature below 10° C. To a reaction mixture was added t-BuOK and reacted for 2 hrs at a temperature of below 10° C. to obtain potassium salt of polyurethane. The result salt was further reacted with butyl tosylate under inert gas atmosphere at a temperature of below 10° C. for 2 hrs and then a small amount of methanol was added to decompose un-reacted t-BuOK. Distilled water was added to precipitate out a polymer and remove by-product tosylate metal salt. The product, polyether poly (N-butyl urethane), was isolated and the pyrolytic temperature was determined. The pyrolytic temperature and the weight average molecular weight are shown in Table 1.

EXAMPLE 3

10 wt. % tetrahydrofuran of the polyether polyurethane was placed into a reactor and an argon gas was passed therein while maintaining a temperature below 10° C. To a reaction mixture was added t-BuOK and reacted for 2 hrs at a temperature of below 10° C. to obtain potassium salt of polyurethane. The result salt was further reacted with polyethylene glycol ($M_n$ 200) ditosylate under inert gas atmosphere at a temperature of below 10° C. for 3 hrs to partially substitute N-position. Tosylate of trioxyethylene glycol monomethylether was then added and reacted for 10 hrs. After the reaction was completed, a small amount of methanol was added to decompose un-reacted t-BuOK. Ether was added to precipitate out a polymer and remove by-product tosylate metal salt. The precipitate was dissolved in distilled water and the solution was extracted with methylene chloride to obtain polyether poly(N-substituted urethane) having trioxyethylene glycol monomethyl ether (conversion rate 95%). The pyrolytic temperature and weight average molecular weight were determined and summarized in Table 1.

EXAMPLE 4

10 wt. % tetrahydrofuran of the polyether polyurethane was placed into a reactor and an argon gas was passed therein while maintaining a temperature below 10° C. To a reaction mixture was added t-BuOK and reacted for 2 hrs at a temperature of below 10° C. to obtain potassium salt of polyurethane. The result salt was further reacted with polyethylene glycol ($M_n$ 200) ditosylate under inert gas atmosphere at a temperature of below 10° C. for 3 hrs to partially substitute N-position. Tosylate of polyethylene glycol monomethyl ether having a number average molecular weight of 350 was then added and reacted for 10 hrs. After the reaction was completed, a small amount of methanol was added to decompose un-reacted t-BuOK. Ether was added to precipitate out a polymer and remove by-product tosylate metal salt. The precipitate was dissolved in distilled in distilled water and the solution was extracted with methylene chloride to obtain polyether poly(N-substitute urethane) having polyethylene glycol monomethyl ether (conversion rate 95%). The pyrolytic temperature and weight average molecular weight were determined and summarized in Table 1.

EXAMPLE 5

10 wt. % tetrahydrofuran of the polyether polyurethane prepared in Preparation Example was placed into a reactor and an argon gas was passed therein while maintaining a temperature below 10° C. To a reaction mixture was added 50 mol % t-BuOK and reacted for 2 hrs at a temperature of below 10° C. to obtain potassium salt of polyurethane. The result salt was further reacted with 50 mol % methyl tosylate to urethane in polyether polyurethane under inert gas atmosphere at a temperature of below 10° C. for 2 hrs. After the reaction was completed, a small amount of methanol was added to decompose un-reacted t-BuOK and distilled water was added to precipitate out a polymer and remove by-product tosylate metal salt. The precipitate was dissolved in distilled water and the solution was extracted with methylene chloride to obtain 50 mol % substituted polyether poly(N-methyl urethane). The pyrolytic temperature and weight average molecular weight were determined and shown in Table 1.

TABLE 1

| Category | Polyether polyurethane | Polyether poly(N-substituted urethane) | | | | |
|---|---|---|---|---|---|---|
| | | Exam. 1 | Exam. 2 | Exam. 3 | Exam. 4 | Exam. 5 |
| $M_w$[1] | 105,000 | 85,000 | 95,000 | 492,000 | 245,000 | 88,000 |
| $T_p$(° C.)[2] | 278 | 365 | 355 | 354 | 343 | 312 |

[1]$M_w$: weight average molecular weight
[2]$T_p$: pyrolytic temperature in the air for 5 wt. % loss As shown in Table 1, it is noted that there is no reduction of molecular weight due to decomposition of the polyether polyurethane as the starting material in the process for preparing poly(N-substituted urethane). It is capable of preparing crosslinked polyether poly(N-substituted urethanes) using a crosslinking agent in Examples 3 and 4. Not only butyl group in Examples 1 and 2 but also trioxyethylene monomethylether or polyethylene glycol monomethylether having 350 of a number average molecular weight in Examples 3 and 4 were substituted on the N-position. Further, the polyether poly(N-substituted urethanes) prepared according to the present invention have excellent thermal stability in thermo-gravimetric analysis.

EXAMPLE 6

10 wt. % tetrahydrofuran of the polyether polyurethane was placed into a reactor and an argon gas was passed therein while maintaining a temperature below 5° C. To a reaction mixture was slowly added 1 equivalent of t-BuOK and reacted for 2 hrs at a temperature of below 5° C. to obtain potassium salt of polyurethane. The result salt was further reacted with 1 equivalent of tosyl dioxyehtylene methyl ether to urethane of polyether polyurethane under inert gas atmosphere at a temperature of below 5° C. for 12 hrs. After the reaction was completed, ether was added to remove solvent and un-reacted compound. The obtained product was dissolved in distilled water and extracted with methylene chloride to obtain substituted N-methyl polyether polyurethane and remove potassium salt of tosylate. The solvent was evaporated to produce polyether poly(N-dioxyethylene methyl ether urethane) having high viscosity. The poly(N-dioxyethylene methyl ether urethane) has a weight average molecular weight of 75,000 and the conversion rate is over 95% in FT-IR analysis.

1 g of the polyether poly(N-dioxyethylene methyl ether urethane) was dissolved in 20 ml of tetrahydrofuran. The resulting solution was added to lithium perchlorate in tetrahydrofuran to make a ratio of the number of moles of the electrolyte compound to the number of moles of ethylene oxide 0.005. The mixture solution was formed to a thin film by using Teflon molding machine and then sufficiently dried.

EXAMPLE 7

Polyether poly(N-substituted urethane) partially crosslinked with oligooxy ethylene having a weight average molecular weight of 492,000 was prepared by the same procedure as in Example 6, except using 95 mol % of tosyl trioxyethylene methylether and 5 mol % of oligooxy ethylene ditosylate which is crosslinkable, instead of 100 mol % of tosyl dioxyehtylene methyl ether.

A solid polymer electrolyte was prepared by the same procedure as in Example 6, except performing that 1 g of the obtained polyether poly(N-substituted urethane) was dissolved in 20 ml of acetonitrile and mixed with acetonitrile solution of lithium triflate to make a ratio of the number of moles of the lithium triflate to the number of moles of ethylene oxide 0.005.

EXAMPLE 8

Polyether poly(N-sub stituted urethane) partially crosslinked with oligooxy ethylene having a weight average molecular weight of 245,000 was prepared by the same procedure as that of Example 6, except using 95 mol % of tosyl heptaoxyethylene methylether and 5 mol % of oligooxy ethylene ditosylate, instead of 100 mol % of tosyl dioxyethylene methyl ether.

Solid polymer electrolyte was prepared by the same procedure as that of Example 6, except performing that 1 g of the obtained polyether poly(N-substituted urethane) was dissolved in 20 ml of acetonitrile and mixed with acetonitrile solution of lithium triflate to make a ratio of the number of moles of the lithium triflate to the number of moles of ethylene oxide 0.005.

Figure 3A:
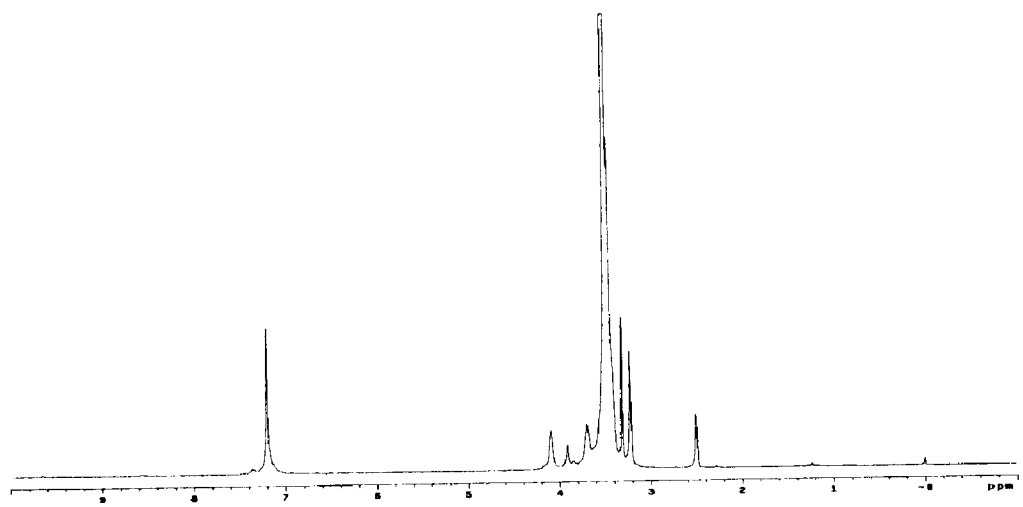
FIG. 3a presents $^1$H-NMR spectrum of the polyether poly(N-oligoethoxy urethane) prepared in Example 8.
Figure 3B:
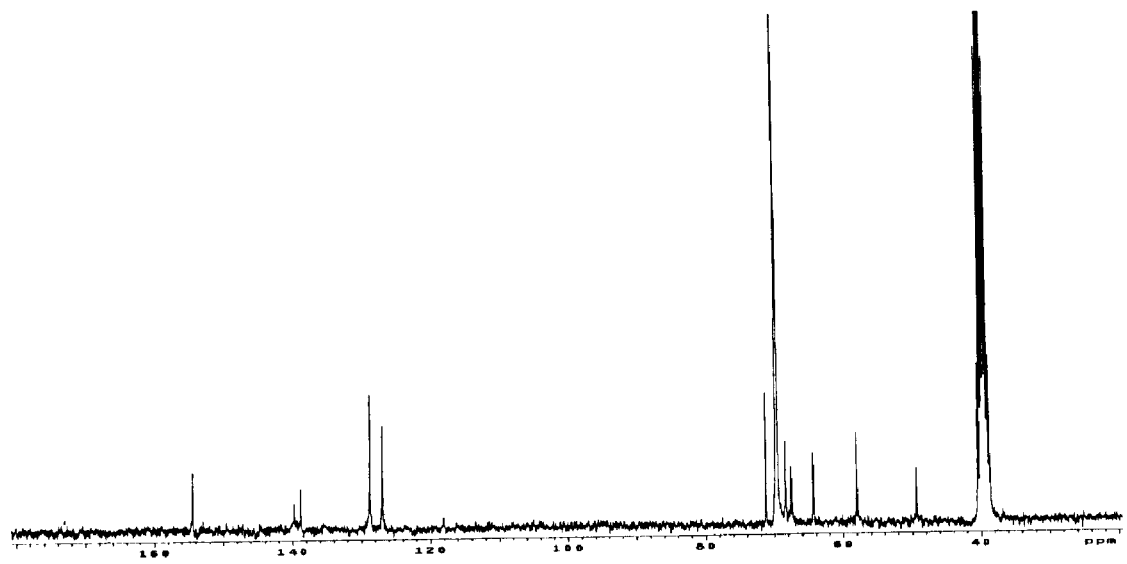
FIG. 3b presents $^{13}$C-NMR spectrum of the polyether poly(N-oligoethoxy urethane) prepared in Example 8.

$^1$H-NMR spectrum and $^{13}$C-NMR spectrum of the obtained polyether poly(N-oligoethoxy urethane) are shown in FIGS. 3a and 3b.

EXAMPLE 9

Polyether poly(N-substituted urethane) having a weight average molecular weight of 85,000 was prepared by the same procedure as that of Example 6, except using 60 mol % of tosylate and 40 mol % of tosyl heptaoxyethylene methylether, instead of 100 mol % of tosyl dioxyehtylene methyl ether. The conversion rate was 95%.

Solid polymer electrolyte was prepared by the same procedure as that of Example 6, except performing that 1 g of the obtained polyether poly(N-substituted urethane) was dissolved in 20 ml of acetonitrile and mixed with acetonitrile solution of lithium triflate to make a ratio of the number of moles of the lithium triflate to the number of moles of ethylene oxide 0.005.

EXAMPLE 10

Polyether poly(N-substituted urethane) having a weight average molecular weight of 87,400 was prepared by the same procedure as that of Example 6, except using 40 mol % of tosylate and 60 mol % of tosyl heptaoxyethylene methylether, instead of 100 mol % of tosyl dioxyehtylene methyl ether. The conversion rate was 95%.

Solid polymer electrolyte was prepared by the same procedure as that of Example 6, except performing that 1 g of the obtained polyether poly(N-substituted urethane) was dissolved in 20 ml of acetonitrile and mixed with acetonitrile solution of lithium triflate to make a ratio of the number of moles of the lithium triflate to the number of moles of ethylene oxide 0.005.

Example of Measuring Glass Transition Temperature and Ionic Conductivity

Such characteristics as glass transition temperatures and ionic conductivities of the polyether poly(N-substituted urethanes) prepared in Examples 6–10 were measured and summarized in Table 2.

Glass transition temperature ($T_g$) was measured in nitrogen atmosphere under the condition of a temperature of from −100° C. to 80° C. and a heating rate of 10° C./min, using a differential scanning calorimeter DSC (manufactured by Rigaku Denki Co., Ltd.).

For the measurement of ionic conductivity, the solid polymer electrolyte was sandwiched between two stainless steel sheets used as electrodes and the ionic conductivity was absorbed at a temperature of 30° C. by using frequency responding analyzer.

TABLE 2

| Category | Examples | | | | |
|---|---|---|---|---|---|
| | 6 | 7 | 8 | 9 | 10 |
| $M_w^{1)}$ of polyether poly(N-substituted urethane) | 71,500 | 492,000 | 245,000 | 85,000 | 87,400 |
| $T_g^{2)}$ of polyether poly(N-substituted urethane) (° C.) | −35 | −47 | −54 | −39 | −51 |
| Ionic conductivity of electrolyte (S/cm)/30° C. | $5.8 \times 10^{-6}$ | $6.9 \times 10^{-6}$ | $8.9 \times 10^{-6}$ | $9.74 \times 10^{-6}$ | $6.71 \times 10^{-5}$ |
| Physical property | Free standing film | Free standing film | Free standing film | Free standing film | Free standing film |

$^{1)}M_w$: weight average molecular weight
$^{2)}T_g$: glass transition temperature As shown in Table 2, the polyether poly(N-substituted urethanes) prepared in Examples 7 and 8 have higher molecular weight than those in Examples 6, 9, and 10 because of better formation of the crosslinked structure, while the polyether poly(N-substituted urethane)s prepared in Examples 6, 9, and 10 provide higher ionic conductivities because of longer side chains. Especially, the polyether poly(N-substituted urethane) prepared in Example 10 has the highest ionic conductivity and it is noted that crystallizability is minimized with an increase of the side chain length formed in a combination of short and long substituents.

As a result, it indicates that the ionic conductivity of the electrolyte of the present invention can be controlled by changing the length, composition, and structure of the side chains within the scope of the invention.

As described above, the solid polymer electrolyte of the present invention provides excellent thermal stability, electrochemical stability and mechanical strength and superior flexibility and ionic conductivity. The characteristics can be controlled by adjusting the length, composition, structure and crosslinked degree of the side chains of polyether poly(N-substituted urethane) matrix. Therefore, the solid polymer electrolyte can be used for electrochemical devices such as a polymer secondary battery.

While the invention has been described with respect to the above specific embodiments, it should be recognized that various modifications and changes may be made to the invention by those skilled in the art which also fall within the scope of the invention as defined by the appended claims.

What is claimed is:

1. A solid polymer electrolyte of polyether poly(N-substituted urethane) comprising an electrolytic compound and a polymer matrix, wherein the polymer matrix is a copolymer having a weight average molecular weight of 50,000–2,000,000 and comprising a polyether unit of formula (1) and poly(N-substituted urethane) unit having oligooxyethylene side chains of formula (2):

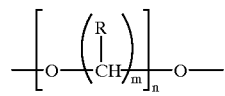
(1)

-continued

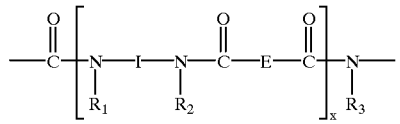
(2)

wherein R is a hydrogen atom or alkyl; R1, R2 and R3 are optionally alkyl, aryl, alkylaryl or oligo(ethylene oxide) derivatives and at least one of R1, R2 and R3 is oligo (ethylene oxide) derivative; I is isocyanate; E is a glycol or an amine having a number average molecular weight of 400 or less; m is an integer of 2–4; n is an integer of 1–60; and x is an integer of 1–5.

2. The solid polymer electrolyte of polyether poly(N-substituted urethane) according to claim 1, wherein the oligooxy ethylene as a N-substituent in said polyurethane unit of formula (2) is expressed by formula (3):

wherein $R_4$ is $C_1$–$C_{12}$ alkyl, mesyl, tosyl, acryl, methacryl, vinyl or glycerol diethoxylate expressed in formula (4a) or (4b) wherein y and r are independently integer of 1–20:

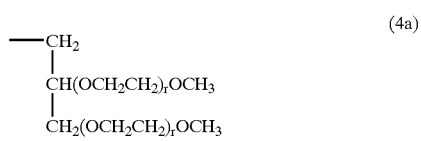
(4a)

-continued

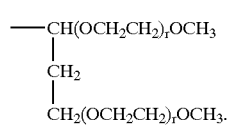
(4b)

3. The solid polymer electrolyte of polyether poly(N-substituted urethane) according to claim 1, wherein said electrolytic compound comprises cations and anions and is soluble in the polyether poly(N-substituted urethane).

4. The solid polymer electrolyte of polyether poly(N-substituted urethane) according to claim 3, wherein said electrolytic compound comprises a cation selected from the group consisting of metal ion, ammonium ion, imidium ion, guanium ion and a mixture thereof, and an anion selected from the group consisting of chloride ion, bromide ion, iodide ion, perchloric ion, thiocyanic ion, tetralluoroboric ion, nitric ion, $AsF_6^-$, $PF_6^-$, stearylsulfonic ion, octylsulfonic ion, dodecylbenzene sulfonic ion, 7,7,8,8-tetracyano-p-puinodimethane ion, $R'SO_3-$, $(R'SO_2)(R''O_2)N-$, $(R'SO_2)(R''SO_2)(R'''SO_2)C-$, $(R'SO_2)(R''SO_2)YC-$ and a mixture thereof wherein R', R", R'" and Y are electron attracting group.

5. The solid polymer electrolyte of polyether poly(N-substituted urethane) according to claim 4, wherein said R', R", R'" and Y are independently perfluoroalyl or perfluoroaryl having $C_1-C_6$ alkyl or aryl; and Y is nitro, nitroso, carbonyl, carboxyl, cyano or trialkylammonium.

6. The solid polymer electrolyte of polyether poly(N-substituted urethane) according to claim 4, wherein said metal cation is selected from the group consisting of Mn, Fe, Co, Ni, Cu, Zn, Ag, Li, Na, K, Rb, Cs, Mg, Ca, Ba and a mixture thereof.

7. The solid polymer electrolyte of polyether poly(N-substituted urethane) according to claim 1, wherein said electrolytic compound is a lithium salt selected from the group consisting of lithium perchlorate, lithium tetrafluoroborate, lithium hexafluorophosphate, lithium trifluoromethansulfonate, lithium bistrifluoromethansulfonylamide and a mixture thereof.

8. The solid polymer electrolyte of polyether poly(N-substituted urethane) according to claim 1, wherein said polyether poly(N-substituted urethane) has a weight average molecular weight of 200,000–1,500,000.

9. The solid polymer electrolyte of polyether poly(N-substituted urethane) according to claim 1, wherein a mol % of said electrolytic compound to an ethyleneoxde unit in said polyether poly(N-substituted urethane) is in the range of 0.0001–5.

10. The solid polymer electrolyte of polyether poly(N-substituted urethane) according to claim 1, wherein said solid polymer electrolyte further comprises an organic solvent.

11. The solid polymer electrolyte of polyether poly(N-substituted urethane) according to claim 10, wherein said organic solvent is selected from the group consisting of ethylene carbonate, propylene carbonate, dimethyl carbonate, ethylmethyl carbonate, dipropyl carbonate, diethoxy ethane, dimethoxy ethane, γ-butyrolactone and a mixture thereof.

12. The solid polymer electrolyte of polyether poly(N-substituted urethane) according to claim 1, wherein said solid polymer electrolyte contains 5–25 wt. % of a ceramic filler selected from the group consisting of silica, alumina, lithium aluminate, zeolite and a mixture thereof, based on the total weight of the solid polymer electrolyte.

13. A battery comprising the solid polymer electrolyte of polyether poly(N-substituted urethane) of any one of claims 1 to 12.

14. A permeable membrane for ionic electrodes comprising the solid polymer electrolyte of polyether poly(N-substituted urethane) of any one of claims 1 to 12.

* * * * *